United States Patent
Mihály et al.

(10) Patent No.: US 10,374,908 B2
(45) Date of Patent: Aug. 6, 2019

(54) METHOD FOR NON-ECONOMIC INCENTIVE BASED USER-NETWORK COOPERATION

(71) Applicant: Telefonaktiebolaget LM Ericsson (publ), Stockholm (SE)

(72) Inventors: Attila Mihály, Dunakeszi (HU); Szilveszter Nádas, Budapest (HU)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/738,610

(22) PCT Filed: Jun. 27, 2016

(86) PCT No.: PCT/IB2016/053826
§ 371 (c)(1),
(2) Date: Dec. 21, 2017

(87) PCT Pub. No.: WO2017/006211
PCT Pub. Date: Jan. 12, 2017

(65) Prior Publication Data
US 2018/0183688 A1      Jun. 28, 2018

Related U.S. Application Data

(60) Provisional application No. 62/189,013, filed on Jul. 6, 2015.

(51) Int. Cl.
*H04L 12/801*    (2013.01)
*H04L 12/851*    (2013.01)
(Continued)

(52) U.S. Cl.
CPC ...... *H04L 41/5022* (2013.01); *H04L 41/5019* (2013.01); *H04L 41/5025* (2013.01);
(Continued)

(58) Field of Classification Search
CPC ............. H04L 41/5022; H04L 41/5051; H04L 47/215; H04L 47/2425; H04L 41/5025;
(Continued)

(56) References Cited

U.S. PATENT DOCUMENTS

2005/0271048 A1* 12/2005 Casey .................... H04L 47/10
370/389
2011/0129076 A1    6/2011 Stanojevic et al.
(Continued)

FOREIGN PATENT DOCUMENTS

| EP | 1045546 A2 | 5/2000 |
|---|---|---|
| WO | 2016107654 A1 | 7/2016 |
| WO | 2016169600 A1 | 10/2016 |

OTHER PUBLICATIONS

Brian Trammell; "IAB Workshop, Stack Evolution in a Middlebox Internet (SEMI), Zurich, Switzerland, Jan. 26-27, 2015"; pp. 1-10; IETF 92 Technical Plenary Report, Mar. 23, 2015, Dallas, TX.
(Continued)

*Primary Examiner* — Un C Cho
*Assistant Examiner* — Lalita W Pace
(74) *Attorney, Agent, or Firm* — Coats + Bennett, PLLC

(57) ABSTRACT

Methods and apparatus for controlling a communication network (2) to deliver traffic to and/or from an end node (4) are presented. In an example method, a network node (8) receives information indicating a user-controllable selection at the end node (4) to have at least some of the end node (4)'s traffic delivered with a low priority level that is lower than a high priority level. Accordingly, the network node (8) controls the communication network to deliver at least some of the end node (4)'s traffic with said low priority level and awards one or more tokens accordingly. Furthermore, the network node (8) may receive information indicating a user-controllable selection at the end node (4) to have at least some traffic delivered with the high priority level. The
(Continued)

network node (8) may accordingly redeem one or more tokens awarded to the end node (4) and controlling the communication network (2) to deliver at least some of the traffic with said high priority level.

15 Claims, 11 Drawing Sheets

(51) Int. Cl.
*H04L 12/24* (2006.01)
*H04L 12/14* (2006.01)

(52) U.S. Cl.
CPC ...... *H04L 41/5029* (2013.01); *H04L 41/5051* (2013.01); *H04L 47/24* (2013.01); *H04L 47/2425* (2013.01); *H04L 47/39* (2013.01); *H04L 12/1489* (2013.01); *H04L 47/11* (2013.01)

(58) Field of Classification Search
CPC . H04L 47/39; H04L 41/5019; H04L 41/5029; H04L 47/24; H04L 47/11; H04L 12/1489; H04L 47/527; G06Q 30/0207; G06Q 30/02; H04W 72/121; H04W 72/1242
See application file for complete search history.

(56) References Cited

U.S. PATENT DOCUMENTS

| | | | |
|---|---|---|---|
| 2011/0166899 A1* | 7/2011 | Sethna | G06Q 10/02 705/5 |
| 2013/0129341 A1* | 5/2013 | D'Errico | H04B 10/1123 398/5 |
| 2014/0003336 A1* | 1/2014 | Padden | H04W 72/10 370/328 |
| 2014/0018063 A1 | 1/2014 | Mattsson et al. | |
| 2014/0126361 A1* | 5/2014 | Tiwari | H04W 76/12 370/230 |

OTHER PUBLICATIONS

Brian Trammell; "Substrate protocol for User Datagrams (SPÜD);" IAB IP Stack Evolution Program; Jun. 11, 2015; pp. 1-14.

Mihály et al.; Middlebox Communication Enabling for Enhanced User Experience draft-mihaly-SPUD-MB-communication-00.txt; Draft, Ericsson; Jul. 6, 2015; pp. 1-19.

* cited by examiner

METHOD FOR NON-ECONOMIC INCENTIVE BASED USER-NETWORK COOPERATION

RELATED APPLICATION

This application claims priority to U.S. Provisional Patent Application Ser. No. 62/189,013, filed Jul. 6, 2015, the entire contents of which are incorporated herein by reference.

TECHNICAL FIELD

The application relates to methods and devices for controlling a communication network to deliver traffic to and/or from an end node.

BACKGROUND

Internet services provided by current Internet Service Provider (ISP) including fixed broadband and Mobile Network Provider (MNP) networks to individual subscribers are 'flat', usually based on peak bitrate charging. This is often extended by applying fixed price data buckets, especially in case of MNPs. The service offered is best-effort, providing 'equal' treatment for the packets of different users and applications through the network. The advantage is simple service agreements, simple network provisioning, and simple charging.

Such a setup is not always optimal from the perspective of either the subscribers or the network service providers. The best-effort networks, especially the MNP networks cannot provide any quality of service (QoS) guarantees for the traffic due to the shared, fluctuating resources on the radio. A differentiated packet or flow treatment may in many cases provide a better overall utility using the available network resources.

There are standardized methods for service differentiation. For mobile networks, a QoS architecture based on bearer concept is described in 3rd Generation Partnership Project (3GPP) technical specification 23.401. Also, a receiver (Rx) interface is specified in technical specification 29.214 to allow interaction between the content provider and the network. The BroadBand Forum has also defined the Broadband Policy Control Framework (specified in Technical Report 134) that meets the similar function of Rx. DiffServ (RFC4594), Virtual Local Area Network (VLAN) Tagging (IEEE-802.1Q) style packet markings can help provide QoS in these environments.

Traditionally, QoS is preferably network-initiated since initiation by user equipment (UE) is not preferred by the network operators to avoid fraud of QoS levels or inconsistencies. This requires network based classification of UE traffic. This classification is done usually by filtering on the header fields, or by deep packet inspection (DPI). Handling of specific traffic and the key performance indicators (KPIs) to fulfil is usually specified by Service Level Agreements (SLA). In general, there is also an economic consequence of using a certain traffic treatment, e.g., extra charging. The operator also runs policy and charging control to identify which users have access to a given service and how much they should pay for the service. Such services occur commonly in today's networks, like Interactive and Personalized (IPTV) in fixed broadband or the voice/video telephony both in fixed and mobile broadband.

Some proposals also allow the end-users to communicate their desires without economic consequences, though these proposals solve the trust issue by not changing the total allocation of the UE, only the relative share of the flows within that UE. The DPI based solutions have several problems. Firstly there is an incentive to masquerade traffic to achieve better service treatment. Secondly there is a trend to encrypt all the traffic of the user, often including protocol fields, which makes DPI harder and harder. Thirdly DPI might recognize the traffic of smaller OTTs wrongly or not at all, which might result in a competitive advantage for the large OTTs.

The service architecture outlined above has some other limitations, as well. One is that it may be applied for a limited number of applications that are specified in advance in the SLAs. The more dynamic, user controlled access to specific services is limited on one hand by the complexity of traffic classification (requiring dynamic signaling especially for encrypted and multiplexed traffic) and policy decision/charging. In terms of charging, there would be a challenge to provide a service that is easily controlled on the user side, which is one reason why bucket-based charging has become so popular. There are also problems in MNP networks with ensuring service guarantees for traffic requiring relatively high bandwidth guarantees due to the shared, limited, and costly radio resources.

The above problems have been addressed by the concept of soft service offerings, i.e., Gold/Silver/Bronze services. In this concept, the Gold users are given relatively higher resource shares than the Silver users, which in turn are given relatively more resources than the Bronze users. Higher preferential treatment comes with extra cost. One problem with these soft service offerings is that there is no strict service guarantees in congestion situations. Another issue with soft service offerings is that the received service is practically impossible to verify on the user side. This leaves the door open to potential user fraud, which it one reason why this type of service has not become popular.

SUMMARY

One or more embodiments herein incentivize "downgrading" the priority level with which an end node's traffic is delivered over a communication network by awarding "tokens" for such downgrading, e.g., when network congestion occurs. These tokens are redeemable for "upgrading" the priority level with which the end node's traffic is delivered over the network, e.g., at a later time or simultaneously for some of the end node's other traffic. In at least some embodiments, the tokens serve as the sole incentive, meaning that the embodiments employ "non-economic" incentives to encourage cooperation between end nodes and network operators.

Some embodiments, for example, include a method for controlling a communication network to deliver traffic to and/or from an end node. The method is performed by a network node. The method comprises receiving information indicating a user-controllable selection at the end node to have at least some of the end node's traffic delivered by the network with a low priority level that is lower than a high priority level. The method also includes, responsive to selection of the low priority level, controlling the communication network to deliver at least some of the end node's traffic with the low priority level and awarding or more tokens to the end node for use of the low priority level. The method further entails receiving information indicating a user-controllable selection at the end node to have at least some of the end node's traffic delivered by the network with a high priority level. Finally, the method comprises, responsive to selection of the high priority level, redeeming one or more tokens awarded to the end node as payment for use of the high priority level and controlling the communication network to deliver at least some of the end node's traffic with the high priority level.

Embodiments herein also include a corresponding method at the end node for controlling a communication network to deliver traffic to and/or from the end node with a priority level voluntarily selected at the end node. The method comprises transmitting, to a network node in the network, information indicating a user-controllable selection at the end node to have at least some of the end node's traffic delivered by the network with a low priority level that is lower than a high priority level, in exchange for the network node awarding the end node with one or more tokens for use of said low priority level. The method also includes, responsive to selection of said low priority level, transmitting and/or receiving at least some of the end node's traffic over the communication network in accordance with said low priority level. The method further entails transmitting, to the network node, information indicating a user-controllable selection at the end node to have at least some of the end node's traffic delivered by the network with a high priority level, with one or more tokens awarded to the end node serving as payment for use of said high priority level. Finally, the method includes, responsive to selection of said high priority level, transmitting and/or receiving at least some of the end node's traffic over the communication network in accordance with said high priority level.

Further embodiments include corresponding apparatus, computer programs, and computer program products.

DETAILED DESCRIPTION

Figure 1:
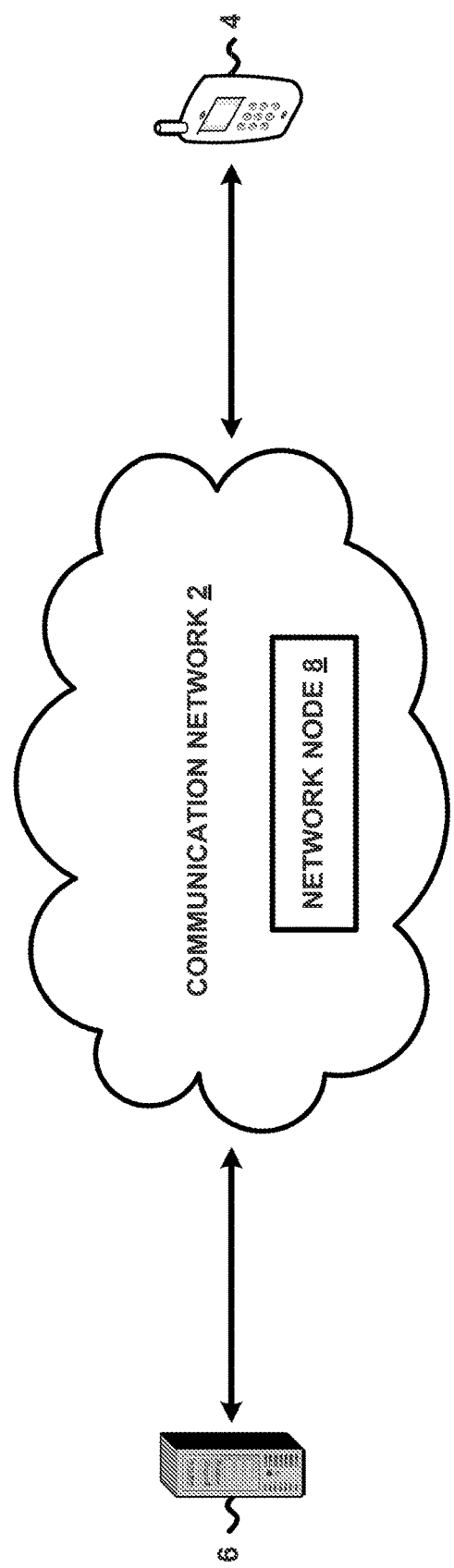
FIG. 1 illustrates a communication network corresponding to example embodiments of the present invention.

FIG. 1 illustrates a communication network 2 (or simply "network"), such as an Internet Service Provider (ISP) network corresponding to example embodiments of the present invention. The network 2 is configured to deliver traffic to and/or from an end node 4, e.g., a user equipment (UE). The network 2 may for instance deliver traffic between the end node 4 and an external server 6, such as a web server or some other content server. Regardless, the network 2 includes a network node 8 (e.g., a Policy and Charging Rules Function, PCRF) configured to control the network 2 to deliver traffic to and/or from the end node 4 with a priority level, the selection of which is user-controllable. In other words, the priority level can be selected by a user of the end node 4 at the end node 4, e.g., manually by the end node's user or automatically according to rules or settings set up by the user. This user-controllable selection may also be referred to herein as a voluntary selection in some embodiments, as the user is able to independently select the priority level of some and/or all traffic to and/or from the end node 4 by manual selection or automatically according to the rules or settings set up by the user.

Figure 2:
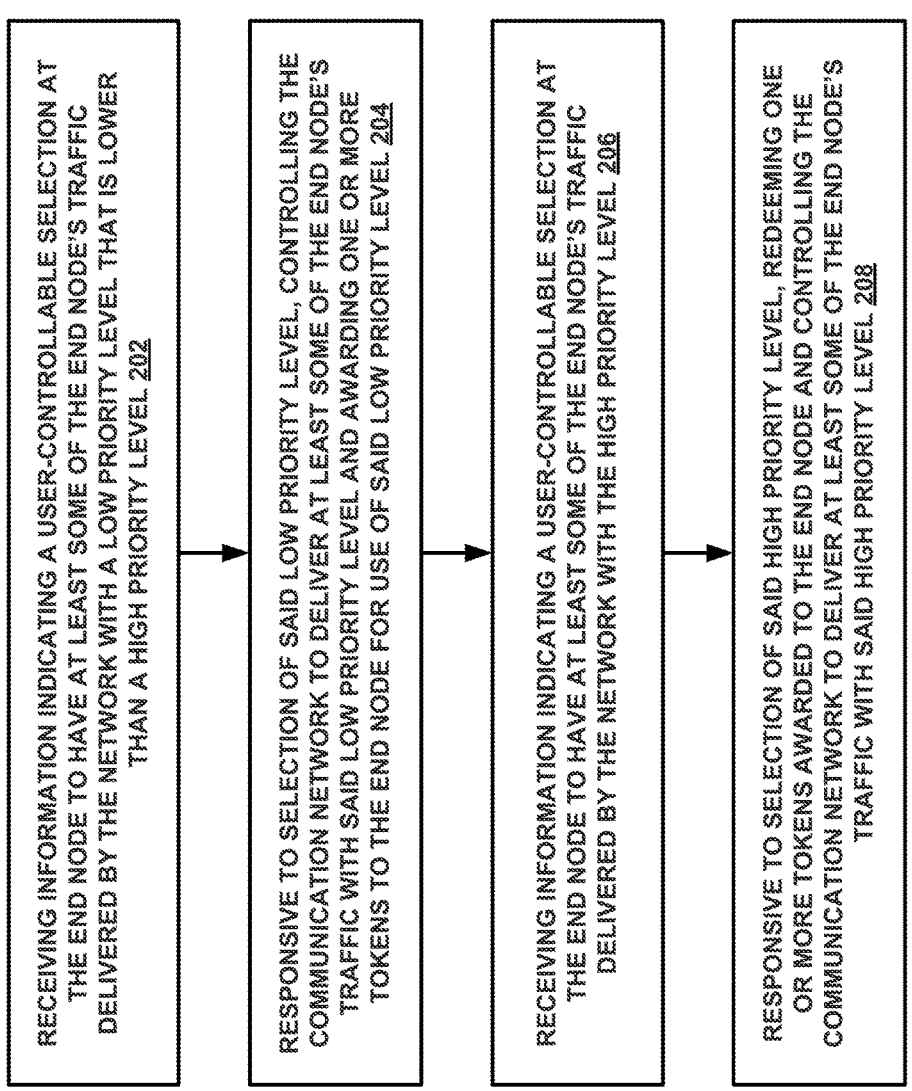
FIG. 2 illustrates a method performed by the network node according to one or more embodiments.

In this context, FIG. 2 illustrates a method 200 performed by the network node 8 for controlling the communication network 2 to deliver traffic to and/or from the end node 4 with a priority level voluntarily selected at the end node 4, according to one or more embodiments. As shown, the method 200 comprises receiving information, e.g., via a Substrate Protocol for User Datagrams (SPUD), indicating a user-controllable selection at the end node to have at least some of the end node's traffic delivered by the network with a low priority level that is lower than a high priority level, at block 202. The method 200 further comprises, at block 304, responsive to selection of said low priority level, controlling the communication network to deliver at least some of the end node's traffic with said low priority level and awarding one or more tokens to the end node for use of said low priority level. A token in this regard constitutes any individual object devoid of traditional economic value (e.g., monetary value) that is designated as a unit of measure for indicating an extent to which a particular priority level is used.

Regardless, the method 200 further comprises, at block 206, receiving information indicating a user-controllable selection at the end node 4 to have at least some of the end node's traffic delivered by the network with the high priority level. Finally, at block 208, method 200 comprises responsive to selection of said high priority level, redeeming one or more tokens awarded to the end node 4 and controlling the communication network 2 to deliver at least some of the end node's traffic with said high priority level.

In at least some embodiments, for example, the communication network 2 has shared transmission resources that multiple end nodes compete for. The priority that the network gives to the end node's traffic, when determining how to allocate the shared transmission resources amongst the different end nodes, depends on the priority level being used by the end node 4. When the end node 4 is using the high priority level, the network gives higher priority to the end node's traffic than when the end node 4 is using the low priority level. In some embodiments, for instance, the high priority level is higher than both the low priority level and a best-effort level in which the communication network 2 delivers the end node's traffic with best-effort service. And the low priority level is lower than both the high priority level and the best-effort level. In this case, no tokens are awarded or required for use of the best-effort level.

In one embodiment, different bearers may be set up for delivering the end node's traffic with different possible priority levels. In this case, the network node 8 may control the network to deliver the end node's traffic with a certain priority level by adjusting traffic flow template settings to switch the bearer over which that traffic is delivered.

Regardless, the extent to which an end node 4 uses the low priority level governs and controls the extent to which the end node 4 can use the high priority level. The communication network 2 thereby incentives use of the low priority level with the right to use the high priority level at a later time or simultaneously for some of the end node's other traffic.

In one or more embodiments, for example, the network node 8 decides whether to allow the end node 4 to use said high priority level based on comparing a number of tokens awarded to the end node 4 to a number of tokens required as payment for use of said high priority level. The network node 8 then redeems one or more tokens awarded to the end node 4 as payment for use of said high priority level only if the network node 8 decides to allow the end node 4 to use said high priority level.

In order to accumulate these tokens, the end node 4 in some embodiments is awarded with a defined number of tokens for each unit of time for which the end node 4 uses said low priority level, and/or is debited a defined number of tokens for each unit of time for which the end node 4 uses said high priority level. Alternatively or additionally, the end node 4 is awarded with a defined number of tokens for each unit of data delivered to and/or from the end node 4 using said low priority level, and/or is debited a defined number of tokens for each unit of data delivered to and/or from the end node 4 using said high priority level. In still other embodiments, the end node 4 is awarded with a defined number of tokens for each unit of congestion that the end node's use of said low priority level spares in at least a part of the network, and/or is debited a defined number of tokens for each unit of congestion that the end node's use of said high priority level consumes in at least a part of the network. In this way, the end node 4 may accumulate tokens in proportion to the extent to which the end node 4 uses the low priority level, and may be debited tokens in proportion to the extent to which the end node 4 uses the high priority level.

The network node 8 in some embodiments, however, also conditions use of the high priority level on the network having enough transmission resources to service that high priority level. That is, the network node 8 in some embodiments decides whether to allow the end node 4 to use said high priority level based on how many shared transmission resources in the network are available for use of said high priority level by the end node 4. If the end node 4 would otherwise be entitled to the high priority level based on the end node's accumulated tokens, but the network does not have sufficient transmission resources to serve the end node 4 with the high priority level, the network node 8 may reject the end node's request for the high priority level. The network node 8 may in this instance take further steps to incentivize end nodes' use of the low priority level, in order to free up additional transmission resources.

In at least some embodiments, for example, the network node 8 restricts use of the low priority level to certain instances or network conditions, such that tokens can only be earned under those instances or conditions. For example, the network node 8 may only allow the low priority level to be used when a congestion level in the network reaches a certain threshold; that is, when moving some end nodes to the low priority level would actually help alleviate some of the congestion. In some embodiments, the network node 8 dynamically adjusts this threshold as needed to encourage or discourage use of the low priority level (e.g., the threshold may be reduced when additional congestion needs to be alleviated).

Regardless, the method in embodiments that restrict use of the low priority level may therefore involve the network node 8 sending a notification to the end node 4 indicating that the low priority level is available for selection at the end node 4. The information indicating end node 4 selection of the low priority level may accordingly be received responsive to sending this notification.

Further in this regard, the method in FIG. 2 in one or more embodiments includes deciding whether to offer the low priority level for selection at the end node 4 based on whether a congestion level in at least a part of the network (e.g., the end user's cell) exceeds a defined threshold. This may in turn entail calculating the congestion level based on determining how many end nodes in at least a part of the network are not receiving target throughputs respectively defined for those end nodes (e.g., where the target throughputs may depend on the priority level selected by those nodes).

The method in one or more other embodiments alternatively or additionally includes deciding whether to offer said low priority level for selection at the end node 4 based on how many ends nodes in at least a part of the network have requested or are requesting said high priority level, and how many tokens are awarded to those end nodes. This may reveal for instance how strained shared transmission resources in at least part of the network are.

In still other embodiments, the method comprises deciding whether to offer said low priority level for selection at the end node 4 based on how many ends nodes in at least a part of the network have requested or are requesting said low priority level.

In yet one or more other embodiments, the method includes deciding whether to offer said low priority level for selection at the end node 4 based on one or more of: how many end nodes in at least a part of the network are active, user activity, and resource estimates related to potential resources that may be re-allocated for potential users.

Further still, the method in some embodiments involves deciding whether to allow the end node 4 to use a given priority level based on how use of the given priority level would affect quality of experience at the end node 4. For example, the network node 8 may only allow use of the high priority level if its use would actually improve the end node's quality of experience (QoE), so as to prevent the end node 4 from "wasting" its tokens. As another example, the network node 8 may only allow the end node 4 to "degrade" its QoE to a certain extent, so as to thereby artificially limit the extent to which the end node 4 can use the low priority level.

Figure 3:
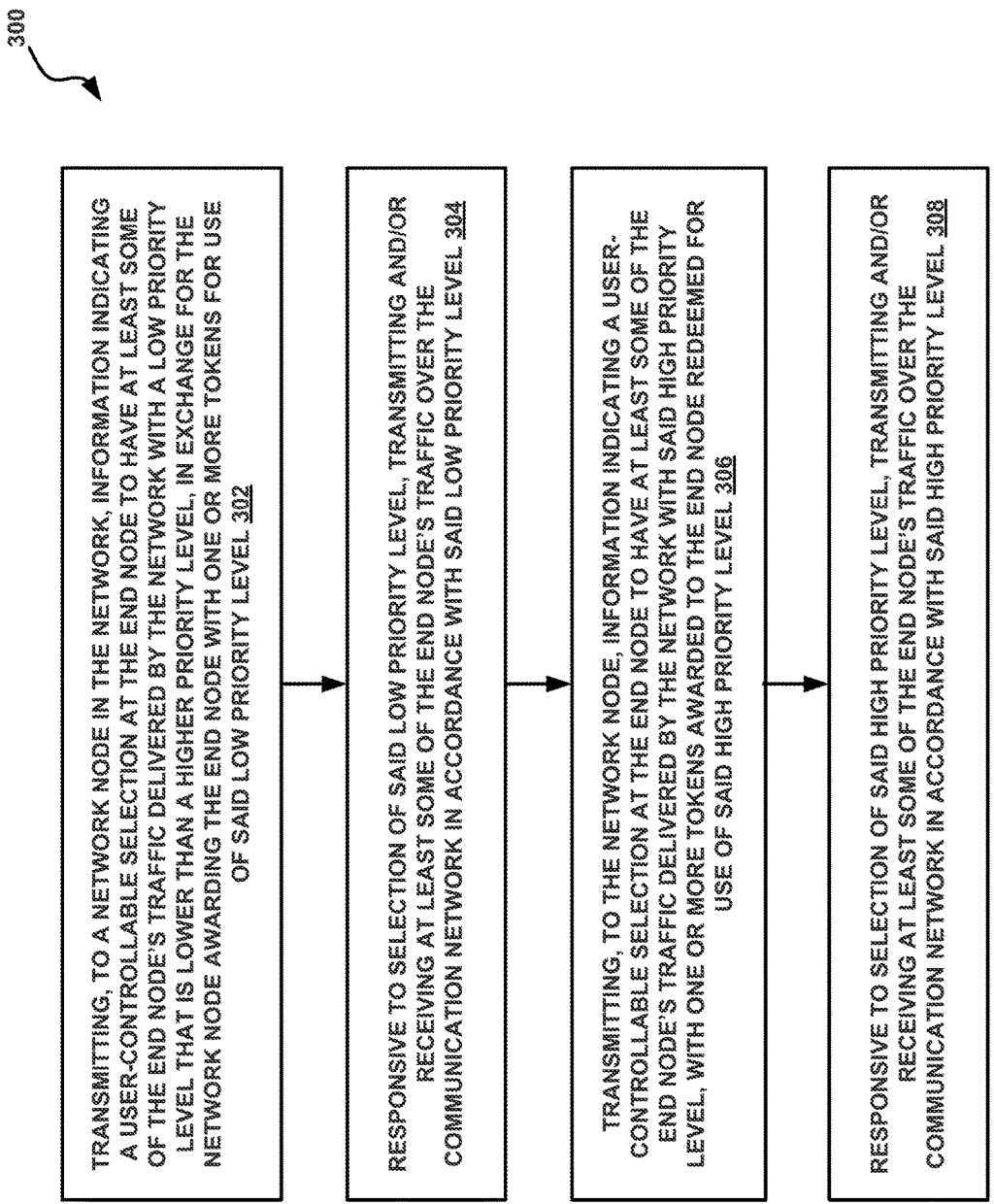
FIG. 3 illustrates a method performed by the end node according to one or more embodiments.

FIG. 3 illustrates a corresponding method 300 performed by the end node 4 for controlling the communication network 2 to deliver traffic to and/or from the end node 4 with a priority level voluntarily selected at the end node 4, according to one or more embodiments. At block 302, the method 300 comprises transmitting, to a network node in the network, information indicating a user-controllable selection at the end node to have at least some of the end node's traffic delivered by the network with a low priority level that is lower than a higher priority level, in exchange for the network node awarding the end node with one or more tokens for use of said low priority level. The method 300 further comprises, at block 304, responsive to selection of said low priority level, transmitting and/or receiving at least some of the end node's traffic over the communication network 2 in accordance with said low priority level.

The method 300 also includes, at block 306, receiving information indicating a user-controllable selection at the end node to have at least some of the end node's traffic delivered by the network with the high priority level. Finally, the method 300 involves, at block 308, responsive to selection of said high priority level, transmitting and/or receiving at least some of the end node's traffic over the communication network in accordance with said high priority level.

As suggested above, the method 300 may also include receiving a notification from the network node 8 indicating that said low priority level is available for selection at the end node 4. In this case, the information indicating selection of said low priority level is transmitted responsive to sending said notification. In at least some embodiments, the end node 4 receives this user-controllable selection of a low or high priority level from a user of the end node 4 via a user interface presented to the user. In this way, the user is able to control the selection of the priority level to be used, without being compelled or otherwise forced by the network to use a certain priority level. In some embodiments, the user-controllable selection is made directly by the user via the user interface, e.g., in the sense that the user manually selects the priority level from amongst different explicit levels. In other embodiments, though, the selection is made indirectly by the user via the user interface, through rules or settings that the user specifies for automatically invoking use of different priority levels by different applications and/or under different conditions.

In at least some embodiments, embodiments herein also allow the end node 4 and/or its user to monitor and/or verify that awarding and debiting of tokens is correct; and/or the high priority level provides higher priority in fact than the low priority level. In one embodiment, for example, the method in FIG. 2 further includes the network node 8 measuring values for one or more metrics associated with the end node's use of the low priority level, calculating a number of tokens awarded to the end node 4 for use of said low priority level as a function of said values, and assisting the end node 4 to verify that the network node 8 awarded a correct number of tokens due to the end node, by sending a report from the network node 8 to the end node 4 indicating said values. A corresponding method at the end node 4 includes measuring values for one or more metrics associated with the end node's use of the low priority level, calculating a number of tokens awarded to the end node 4 for use of said low priority level as a function of said values, and verifying that the network node 8 awarded a correct number of tokens due to the end node, by inspecting a report received from the network node 8 indicating said values.

Note that the network node 8 herein could be the PCRF i.e., the policy decision node in the 3GPP architecture, though this is a non-limiting example. In principle, the network node 8 could be any other node in the ISP network or any other connected network, e.g., a router, switch, gateway, mobile management entity, eNodeB, base station, access point, or any other device or logical module. In some examples, the network node 8 may be (or may include) the server 6 (see FIG. 1) that communicates with the QCA, and also with the PCRF. In case of in-line signaling e.g., the referred SPUD, there may be a network node 8 (e.g., a 3GPP Traffic Detection Function TDF) that conveys the control packets to the PCRF/Web server. The server 6 herein in FIG. 1 could be different web servers, Facebook servers, YouTube servers, etc. Note also that embodiments herein could be applied also to the servers, i.e., the servers 6 are in some kind of business relation with the ISP, and exchange information related to need and possibility to access specific service options in a similar way. Note that because of higher technical competence, server 6 applications may implement the functionality needed for the communication and control, a QCA-like application thus may not be needed for the server 6 case.

Figure 4:
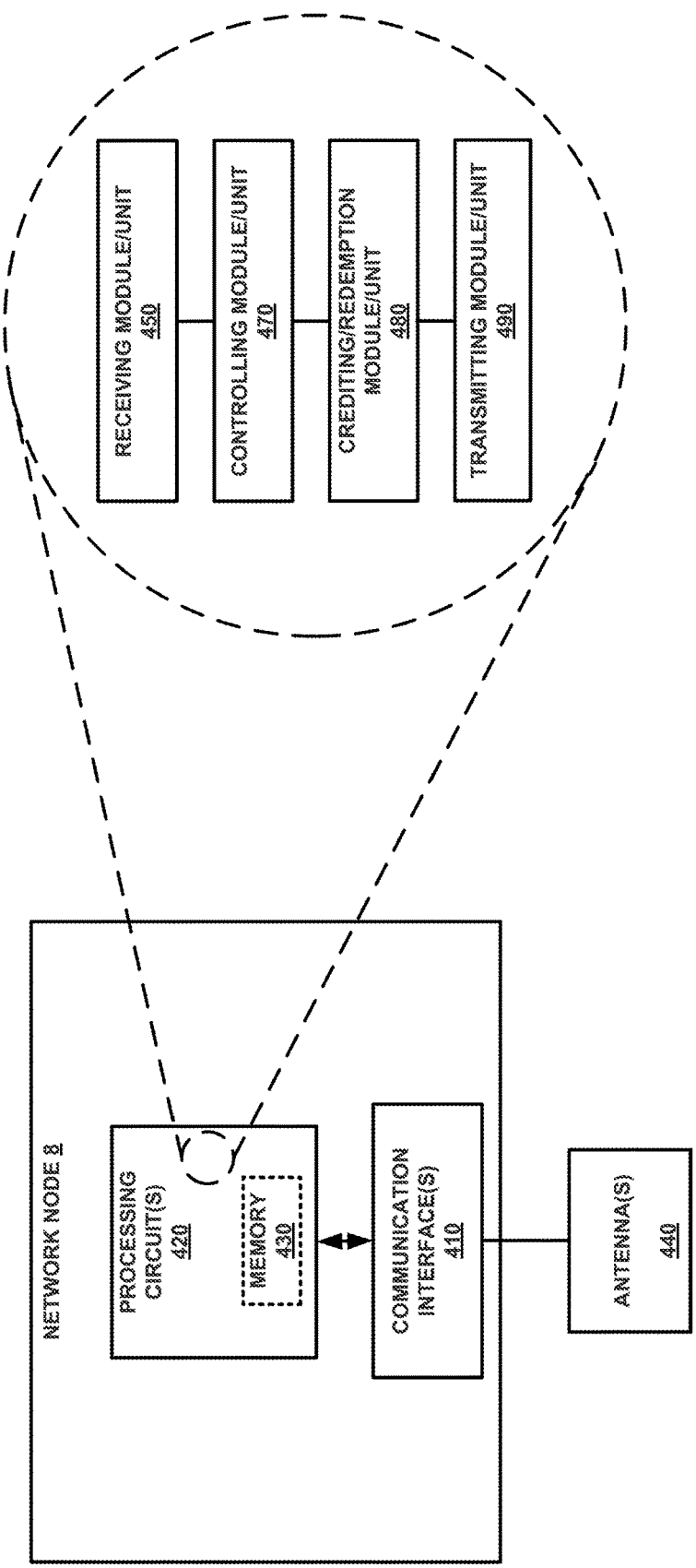
FIG. 4 illustrates details of an example network node according to one or more embodiments.

With the above modifications and variations in mind, FIG. 4 illustrates additional details of the network node 8 according to one or more embodiments. The network node 8 is configured, e.g., via functional means or units, to implement the processing in FIG. 2. The node 8 in some embodiments for example includes a receiving means or unit 450, a controlling means or unit 470, a crediting/redemption means or unit 480, and a transmitting means or unit 490 for performing the steps in FIG. 2.

In at least some embodiments, the node 8 comprises one or more processing circuits (or processors) 420 configured to implement processing of the method 200 of FIG. 2, such as by implementing functional means or units above. In one embodiment, for example, the processing circuit(s) 420 implements functional means or units as respective circuits. The circuits in this regard may comprise circuits dedicated to performing certain functional processing and/or one or more microprocessors in conjunction with memory 430. In embodiments that employ memory 430, which may comprise one or several types of memory such as read-only memory (ROM), random-access memory, cache memory, flash memory devices, optical storage devices, etc., the memory 430 stores program code that, when executed by the one or more for carrying out one or more microprocessors, carries out the techniques described herein.

In one or more embodiments, the node 8 also comprises one or more communication interfaces 410. The one or more communication interfaces 410 include various components (e.g., antennas 440) for sending and receiving data and control signals. More particularly, the interface(s) 410 include a transmitter that is configured to use known signal processing techniques, typically according to one or more standards, and is configured to condition a signal for transmission (e.g., over the air via one or more antennas 440). In an aspect, the transmitting module or unit 490 may comprise or may be in communication with the transmitter. Similarly, the interface(s) include a receiver that is configured to convert signals received (e.g., via the antenna(s) 440) into digital samples for processing by the one or more processing circuits. In an aspect, the receiving module or unit 450 may comprise or may be in communication with the receiver. The transmitter and/or receiver may also include one or more antennas 440.

Figure 5:
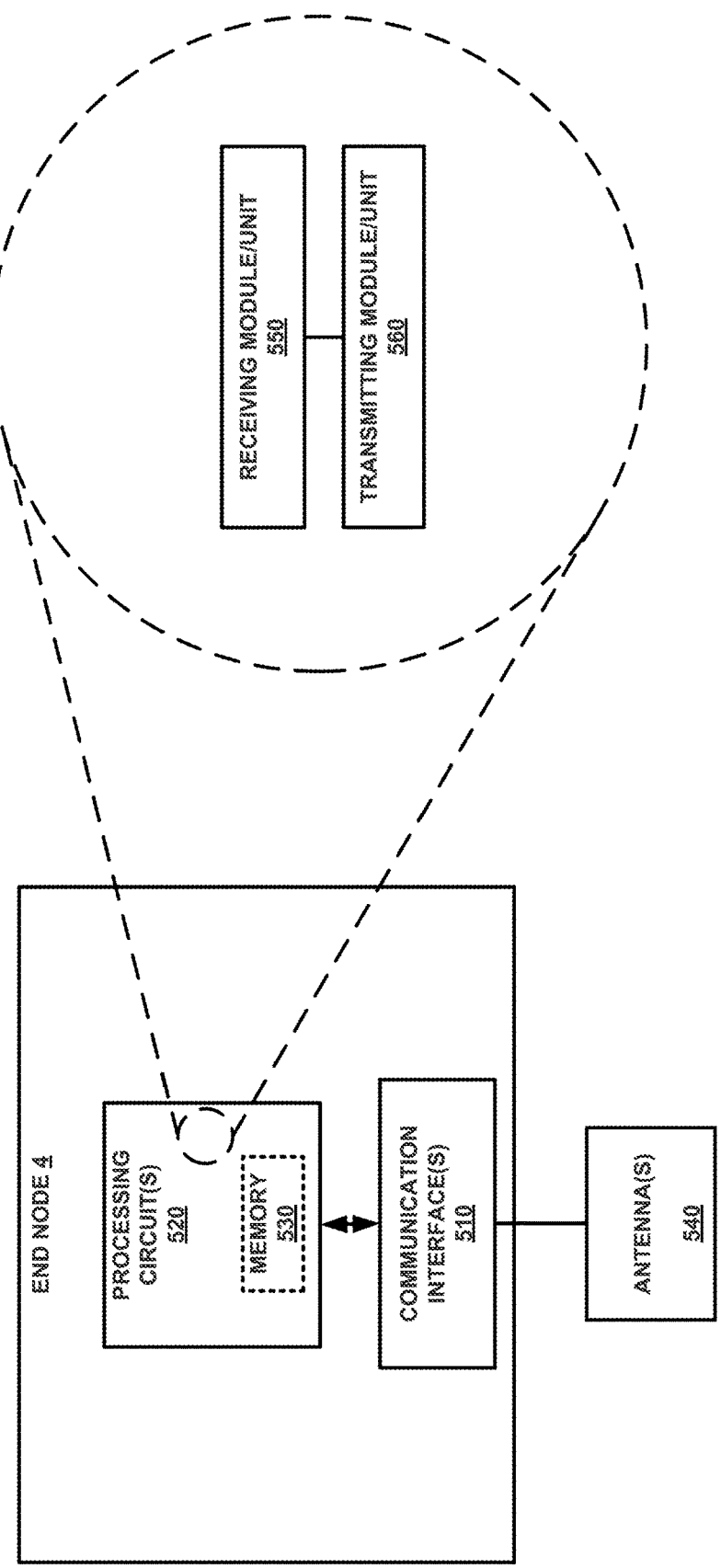
FIG. 5 illustrates details of an example end node according to one or more embodiments.

FIG. 5 similarly illustrates additional details of the end node 4 according to one or more embodiments. The end node 4 is configured, e.g., via functional means or units, to implement the processing that carries out the method 300 in FIG. 3. The end node 4 in some embodiments for example includes a receiving means or unit 550 and a transmitting means or unit 560 for performing the steps in FIG. 3. In at least some embodiments, the end node 4 comprises one or more processing circuits (or processors) 520 configured to implement the processing, such as by implementing functional means or units. In one embodiment, for example, the processing circuit(s) implements functional means or units as respective circuits. The circuits in this regard may comprise circuits dedicated to performing certain functional processing and/or one or more microprocessors in conjunction with memory 530. In embodiments that employ memory, which may comprise one or several types of memory such as read-only memory (ROM), random-access memory, cache memory, flash memory devices, optical storage devices, etc., the memory 530 stores program code that, when executed by the one or more for carrying out one or more microprocessors, carries out the techniques described herein.

In one or more embodiments, the end node 4 also comprises one or more communication interfaces 510. The one or more communication interfaces 510 include various components (e.g., antennas 540) for sending and receiving data and control signals. More particularly, the interface(s) include a transmitter that is configured to use known signal processing techniques, typically according to one or more standards, and is configured to condition a signal for transmission (e.g., over the air via one or more antennas 540). In an aspect, the transmitting module or unit 560 may comprise or may be in communication with the transmitter. Similarly, the interface(s) include a receiver that is configured to convert signals received (e.g., via the antenna(s) 540) into digital samples for processing by the one or more processing circuits 520. In an aspect, the receiving module or unit 550 may comprise or may be in communication with the receiver. The transmitter and/or receiver may also include one or more antennas 540.

Those skilled in the art will also appreciate that embodiments herein further include corresponding computer programs. A computer program comprises instructions which, when executed on at least one processor of the network node 8 or the end node, cause the node to carry out any of the respective processing described above. Embodiments further include a carrier containing such a computer program. This carrier may comprise one of an electronic signal, optical signal, radio signal, or computer readable storage medium. A computer program in this regard may comprise one or more code modules corresponding to the means or units described above.

The embodiments presented in the present disclosure can benefit both networks and subscribers by allowing networks to allocate resources evenly, for instance, when there is a congestion event. In particular, the embodiments provide a generic light-weight solution that makes cooperation possible between the subscribers and the network during traffic scheduling operations. The exemplary solutions herein can apply to traffic that can involve many different application types and can take into account both the user policy (which applications should receive more or less resources) and operator policy (control over which users/applications should be prioritized). These solutions allow the networks/operators to provide soft service guarantees with no extra cost, thus avoiding some of the problems with the SLA-based service offerings discussed above.

The embodiments presented herein also avoid other problems of existing systems. For instance, some existing systems cannot avoid misuse of a certain service by users because there is no penalty (i.e., higher price) for using the more favorable service. As such, some users select to use a higher level of service in all cases, regardless whether its traffic flows require the higher level of service. In addition, the existing systems lack the means for monitoring and verifying data that uses the service on one or both the network and user side. For instance, these existing solutions do not provide measurable metrics that identify how a given treatment/service level performs compared to corresponding performance when using a different treatment/service level.

To address these issues, the present disclosure includes one or more embodiments implementing a cooperation framework that can utilize existing charging models (e.g., peak bitrate and optional buckets), but allows the subscriber, or "user," to request different treatment for its traffic flows and also provides incentives for the user not to overuse a given treatment level. According to certain embodiments, the ISP offers different options for service delivery. For instance, a "background" service delivery option may be offered when there is a need for additional network resources for some traffic. In some examples, this background service delivery option may correspond to a low priority level for traffic, such as that discussed above (e.g., in reference to FIGS. 2 and 3). The users of this service delivery option are given relatively lower resource share than if they were using the generic "best-effort" service. As a result, other users can benefit from the fact that the users using the background service delivery option can be down-prioritized when accessing shared resources, e.g. time and/or frequency resources associated with a radio cell. In turn, the ISP offers tokens, which are objects that represent the right to perform a certain action. In this context, the users can request a so-called "priority" service delivery option (high priority level) if they have accumulated tokens by using the background service delivery option (low priority level). Users thus are motivated to request the background service delivery option when their traffic copes with more relaxed network QoS.

Example embodiments also include the possibility and method on both the user and network side for bookkeeping the actual tokens the user has been awarded and monitoring of the KPIs of the background service delivery option and a "prioritized" service delivery option. This may be used for verification of service delivery option accessibility and service delivery option usage.

Figure 6:
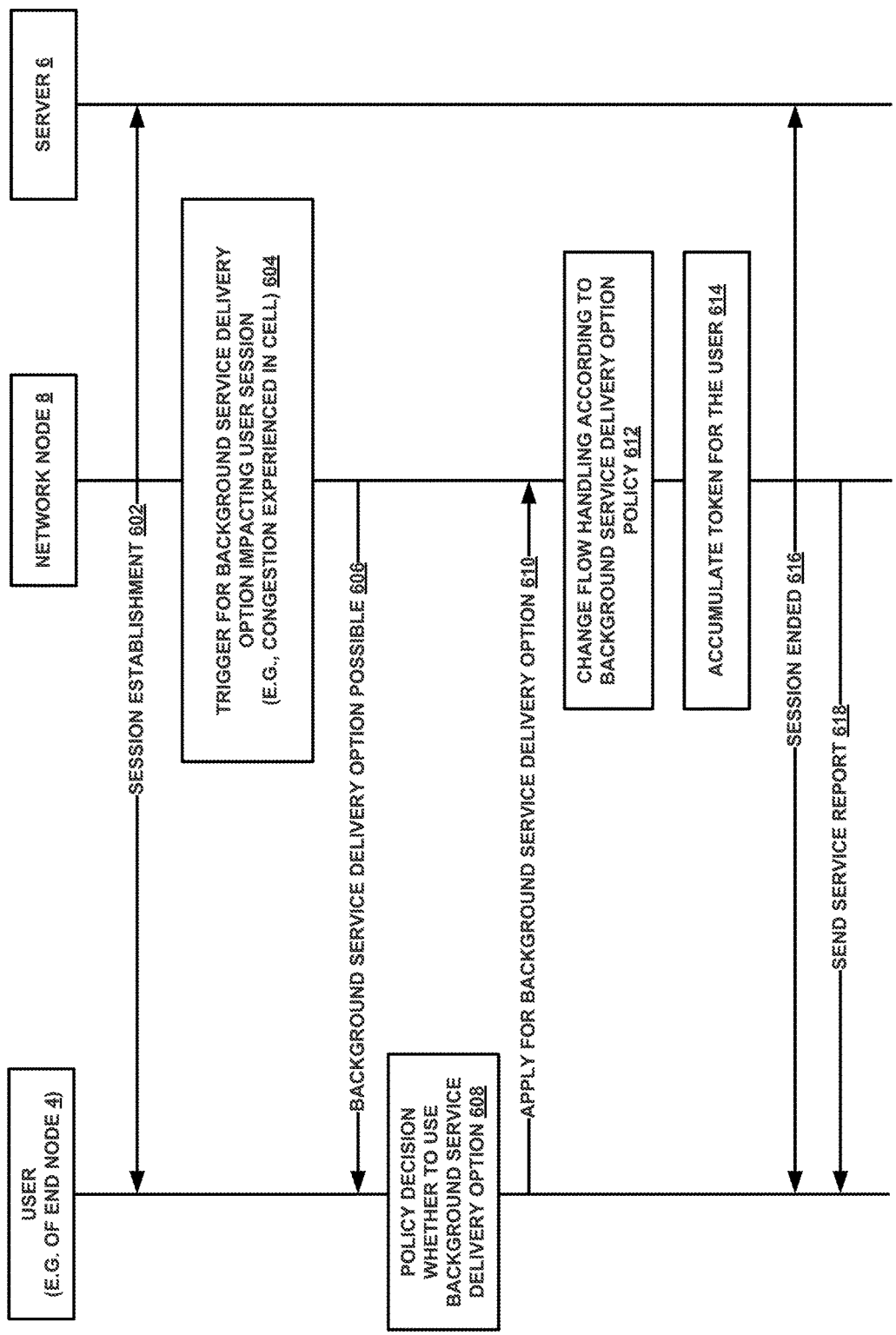
FIG. 6 shows a signaling flowchart illustrating further example processes utilized in one or more embodiments.

FIGS. 6-9 present message flowcharts illustrating example embodiments of the techniques described in the present disclosure. For instance, as shown in FIG. 6, a session can be established (602) between a user (e.g., end node 4 of FIG. 1) and a server (e.g., server 6 of FIG. 1) carrying traffic for which a low priority level, or the background service delivery option, is available but which is currently communicated using a normal, or "best effort," service level. At a given time, the network may experience congestion, which generates a trigger (604) for the possibility of using background service delivery option. The associated trigger condition may include a congestion measure reaching a threshold value. The congestion measure and/or threshold can be measured in terms of a percentage of users in a region or cell that do not receive their target throughput in a certain period in some examples. This target throughput for a user/flow may depend on the selected service delivery option level. Alternatively or additionally, the congestion measure and/or threshold can be measured in terms of a number of users requesting prioritized service delivery option and the token available for those users, a number of users applying for background service delivery option (if offered by the network), a total number of active users, user activity, and/or resource estimates related to potential resources that may be re-allocated for potential users.

The decision logic may also inspect whether it is possible to improve the QoE of the affected user or end node 4 at all, by applying a given service delivery option (e.g., high priority level or low priority level). Note that the same decision for all background service delivery option requests (or whether to offer a particular traffic priority level) may not necessarily be applicable to all active users in the area. Likewise, it is possible that not all prioritized service delivery option requests in an area are accepted (or offered in all cases). Acceptance may depend, for instance, on the air interface channel condition of the device and the amount of resources.

In some examples, based on generation of the trigger, a notification that the background service delivery option is possible is sent (606) to all impacted end nodes 4 (i.e., users). The notification and service delivery option request can use any existing signaling methods. For example, in a 3GPP-like approach the request may use standard Rx signaling to/from the PCRF. Alternatively, signaling methods unique to the presently disclosed embodiments may be applied. For example, HTTP-based signaling may be transmitted to an Adaptation Proxy, which can then convey the communication to the PCRF, TDF, or directly to a policy enforcement point in the packet core. A further alternative is in-band communication of notifications and service delivery option requests.

Optionally, uplink packet markings or the SPUD protocol may be utilized for the notification and service delivery option request, which would provide a number of advantages. For example, SPUD is based on declarations only so no negotiation is needed between the parties, endpoints/middleboxes may trust the communication (but can verify), SPUD utilizes incremental usefulness such that no mandatory minimum vocabulary is required. Declarative marking originally aimed to treat all markings on packets and flows as relative to other markings on packets and flows from the same sender. The main reason for this was to avoid a determination at a receiver as to whether the sender was transmitting proper information. However, in this case, this is solved, so the method proposed allows for relative treatment among different senders, which provides higher overall network utility. In addition, SPUD facilitates network-based classification of encrypted and multiplexed user traffic. An increasing amount of OTT (over the top) internet traffic is encrypted and this trend is likely to continue. Such encryption combined with multiplexing the traffic into the same connection as in WebRTC, SCTP or QUIC, makes it difficult to classify traffic in the network by header filtering or DPI. The SPUD mechanisms, however, are applicable for such traffic classification.

Regardless of the particular delivery method, there is a policy decision made (608) at the end node 4 (i.e., by user associated with an end node 4 of FIG. 1) regarding whether the conditions are such that the given session may use the background service delivery option (or "low priority level"). The policy decision (608) at the end node 4 by the user may be based on user decisions about which applications are allowed to use the different (background or prioritized, low or high priority level) service delivery options. For this, the individual applications or the QoE-controlling application have a user front-end, where the user may configure its desired policy settings, i.e, which applications and in which conditions may be downgraded to the background service delivery option and which are those and in which conditions that could benefit from the prioritized service delivery option. As such, even though the user does not directly select (i.e., by manual input) a priority level or service delivery option when the user-configured policy settings are implemented, such selections are still considered to be user-controlled by virtue of the user's previous policy configuration.

If the policy decision is "yes" (at 608), then the end node 4 applies for the background service delivery option for this session. If the network node 8 accepts the request for the background service delivery option, and the network changes the flow handling of the given session according to the background policy (612). Specifically, for mobile core-RAN bottleneck communication and RAN resource sharing one can apply the standard domain QoS mechanisms, e.g., the QoS bearer concept in 3GPP networks. For example, there could be three long-lived bearers set up for each terminal, one for the normal BE service, one for the background and one for the prioritized service delivery option. Given that the policy enforcement node in the core network receives an indication that a certain flow should change treatment, the Traffic Flow Template (TFT) settings of the corresponding bearers are changed such that the given flow switches from the actual bearer to the new bearer.

In addition, the network also starts to accumulate/track tokens for the given user (614). There may be different ways for token calculation. For instance, with time-based calculation, the number of accumulated tokens depends on the time during which the background service delivery option (low priority) was used by the user/end node 4 (given a certain utilization level of the available resources). Under byte-based calculation, the tokens awarded are proportional with the downloaded bytes (given a certain utilization level of the available resources). Alternatively, more sophisticated calculation measures may be implemented, e.g., congestion 'volume' spared by the user by using the background service delivery option. Any of the above methods of token calculation may be used both in the user and network side since the information that is based on it available. Thus, authority of service delivery option access may be verified by both ends. The effects of using a certain service delivery option may be verified by the client by specific client application that collects statistics, i.e., different KPIs both with and without using the service delivery option, and thus the statistical differences become apparent for the users. This may be also done simultaneously for different user applications by the QCA (see FIG. 9).

After the traffic has been communicated using the one or more selected priority levels and the session ends (616), the network may send a service report (618) to the user/end node 4 including e.g., the session identification that used the background service delivery option, the time elapsed, traffic volume sent, tokens accumulated etc.

Figure 7:
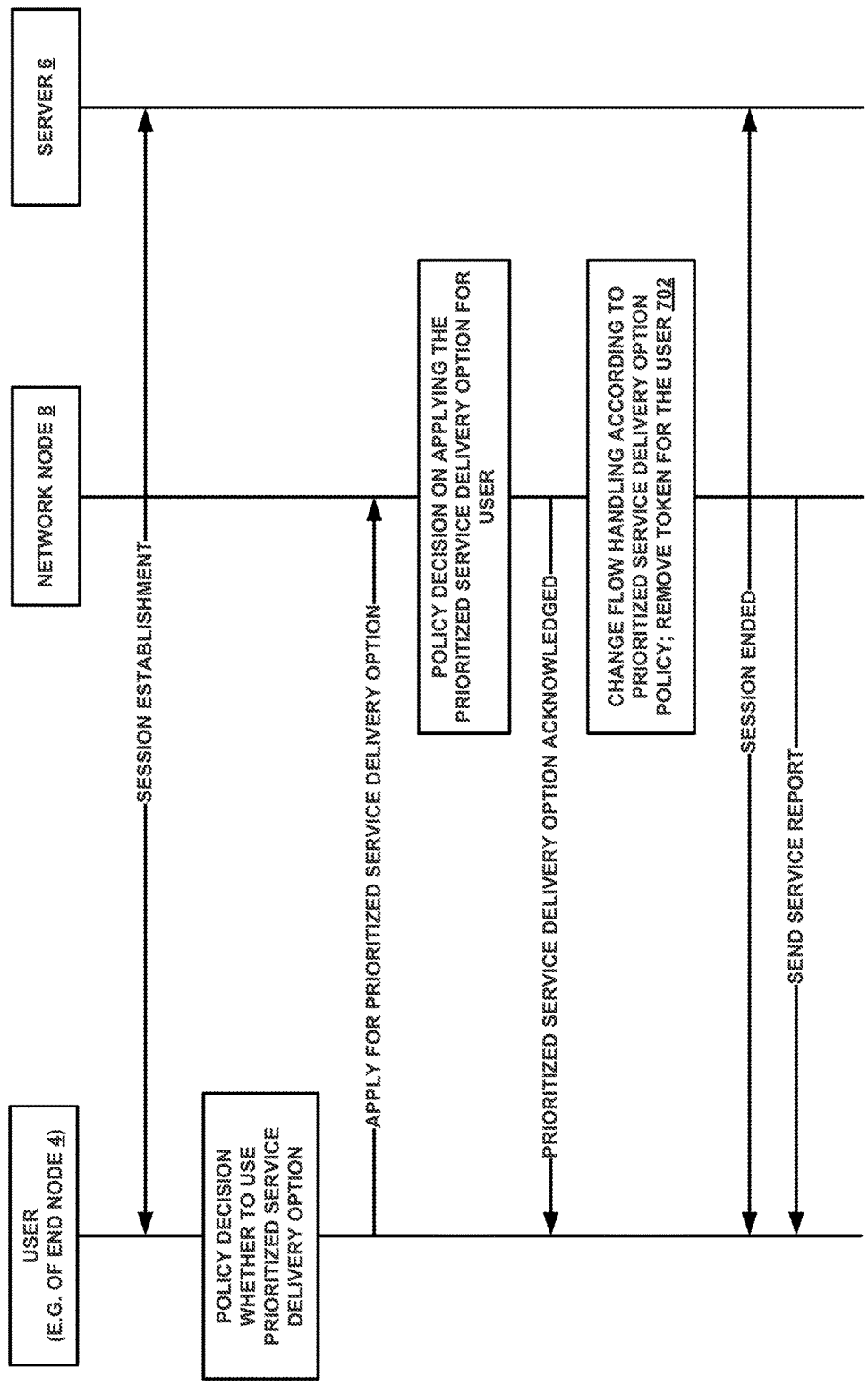
FIG. 7 shows a signaling flowchart illustrating further example processes utilized in one or more embodiments.

Of course, although the signal flowchart of FIG. 6 involves implementation of a background service delivery option (e.g., low priority level), a similar procedure can be implemented for other particular traffic priority levels or service delivery options. For instance, FIG. 7 illustrates an example implementation similar to that of FIG. 6, but where a prioritized service delivery option (e.g., high priority level) is implemented. In line with the embodiments described above, instead of awarding tokens to the user as in FIG. 6, tokens are removed from the token tally associated with the user (702).

Figure 8:
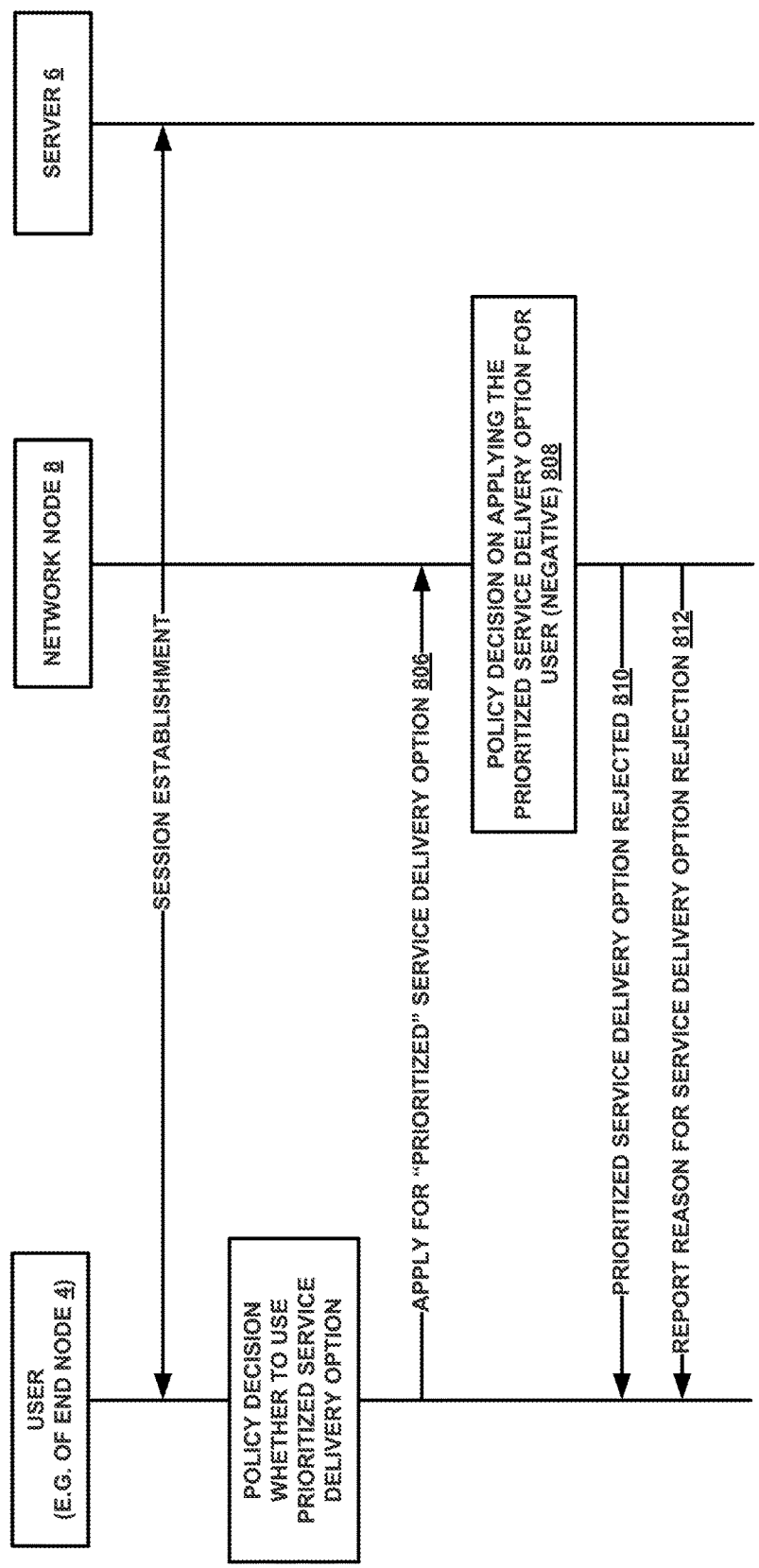
FIG. 8 shows a signaling flowchart illustrating further example processes utilized in one or more embodiments.

Furthermore, in an alternative to the above implementation examples of FIGS. 6 and 7, the network may deny or reject a service level request from an end node 4 when it comes to a negative policy decision (808), as shown in the flowchart of FIG. 8. In such an instance, a 'reject' message is sent (810) with or before a report (812) indicating a reason of the rejection. Example reasons may include no tokens available for the user, insufficient network resources available to perform network prioritization, etc.

As introduced above, a service delivery option request may be generated and sent to the network node 8 by the application that controls its QoE after a user-controlled selection is made for the application's traffic. However, an appropriate service delivery option may also be selected in an application-agnostic way, for instance, by an external application, which is referred to herein as the Quality of Experience controlling application (QCA)) and may be installed by the ISP on the end node 4 of a user. The QCA allows for user selection and application of a particular service level to traffic of multiple applications to/from the end node 4. In some embodiments, when installing the QCA to the end node 4, an application designer (or provider/operator) or the ISP may provide default traffic quality settings or service delivery option selection settings that the user can control by alteration or confirmation thereof.

Figure 9:
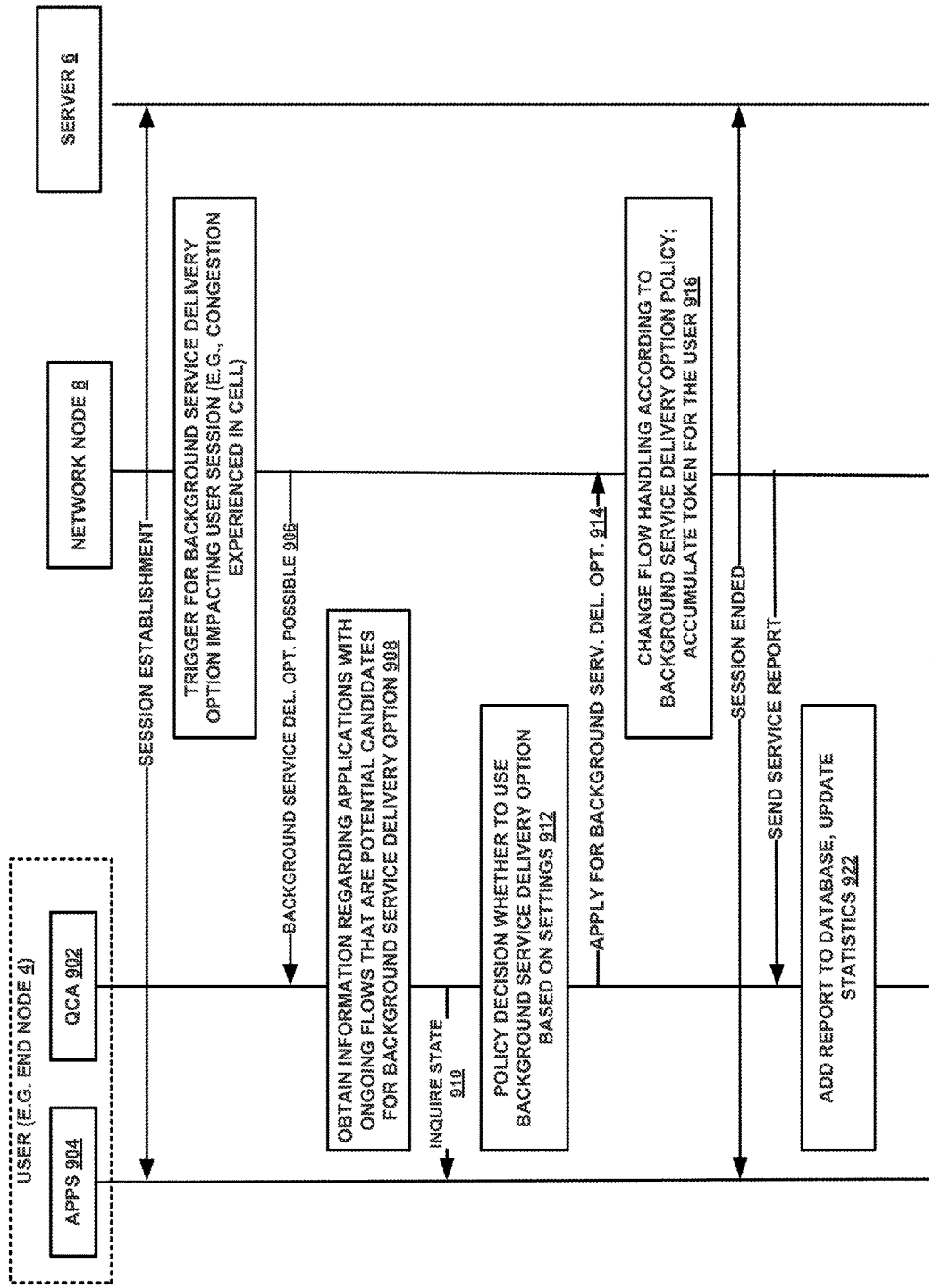
FIG. 9 shows a signaling flowchart illustrating further example processes utilized in one or more embodiments.

An example embodiment that utilizes such a QCA is illustrated in the flowchart of FIG. 9. In the illustrated example implementation, a QCA 902 associated with the end node 4 performs end node communication with the network (via network node 8). For instance, the QCA 902 may perform such communication by receiving network notifications (e.g., notifications regarding possible service delivery options (906)) and sending service delivery option requests (e.g., optionally apply for background service delivery option (914)). In order to be able to send meaningful service delivery option requests related to traffic in the applications' ongoing flows, QCA 902 may obtain information about the applications 904 that may use different ("background" or "prioritized," or, correspondingly, low or high priority levels) service delivery options (908). Such information can include when each of the applications 904 use the network resources, their identification (e.g., five-tuple) and potentially about the experienced QoE for these applications 904. QCA 902 may also send an inquiry (910) to the applications 904 (one or more modules managing the applications 904) to determine a state of each respective application 904 (e.g., actively communicating or idle state).

Based on the obtained information and states of applications 904, the QCA 902 may make a policy decision (912) regarding whether the conditions are such that the given application session may use a particular priority level or service delivery option. If the policy decision returns positive, or "yes," the end node 4 requests the associated priority level or service delivery option (in the specific example of FIG. 9, the background service delivery option) for the applicable application traffic (914). If the request is granted, the network (e.g., via network node 8) changes the flow handling of the given session to correspond to that of the requested policy (916). In addition, as indicated as an example aspect in FIG. 9, after the session has ended and the session service report is transmitted to the end node 4 (here, to the QCA 902 of end node 4), the end node 4 (e.g., via QCA 902) may add the report to a local or network-side database and update relevant statistics related to the end node 4, its user, the recently terminated session or historical session metrics, one or more applications, etc. accordingly In an example implementation, a user downloading software updates to an end node 4 is notified that due to high cell load he is eligible for background service delivery option (or low priority level of traffic). Afterwards it uses the accumulated tokens for his critical traffic, when its QoE is not good enough. An example of using accumulated tokens e.g., a prioritized download of the critical content of a web page to shorten the time until rendering starts and/or the user can control the page.

Figure 10A:
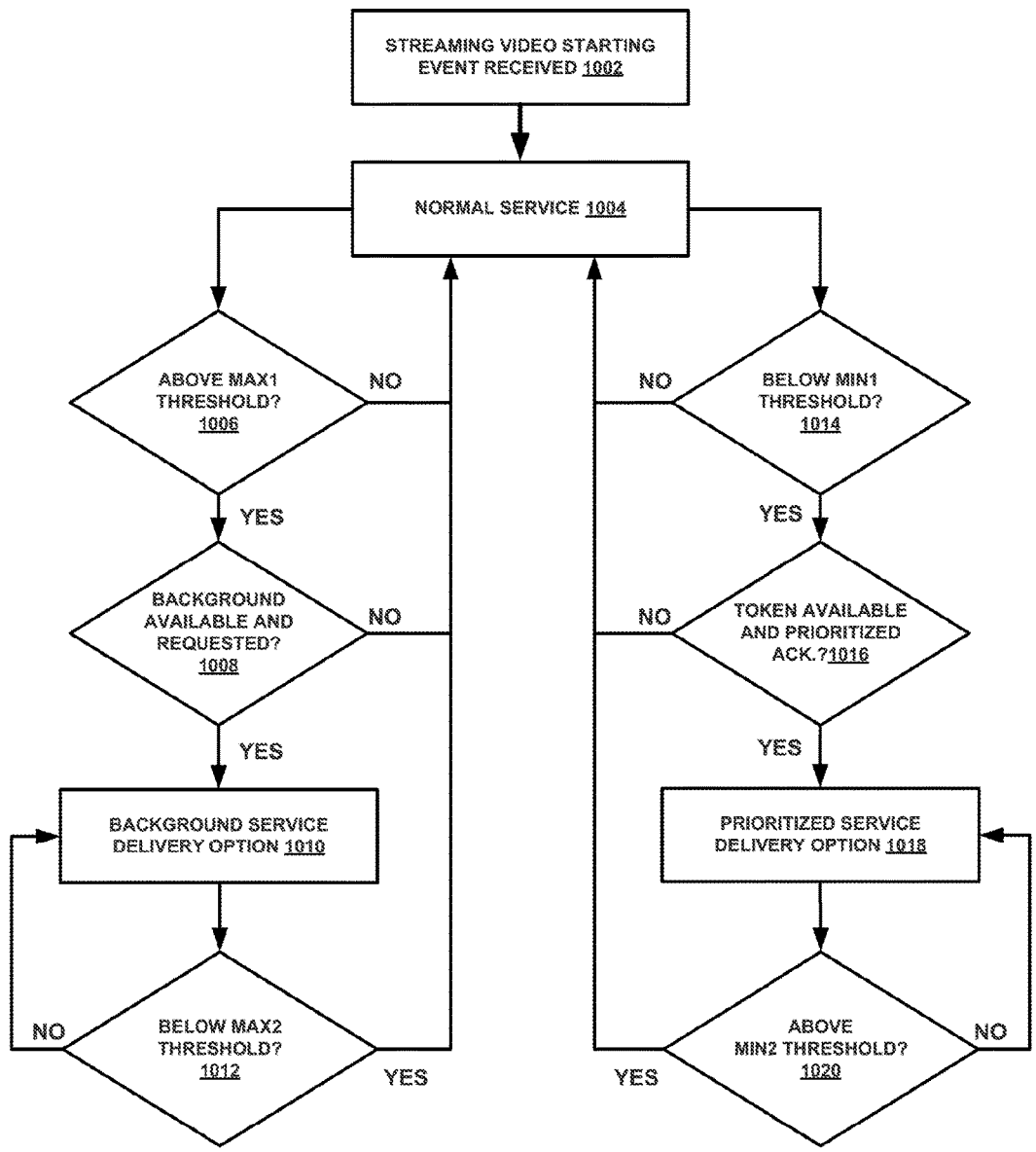
FIG. 10A illustrates a method performed by the end node according to one or more embodiments.
Figure 10B:
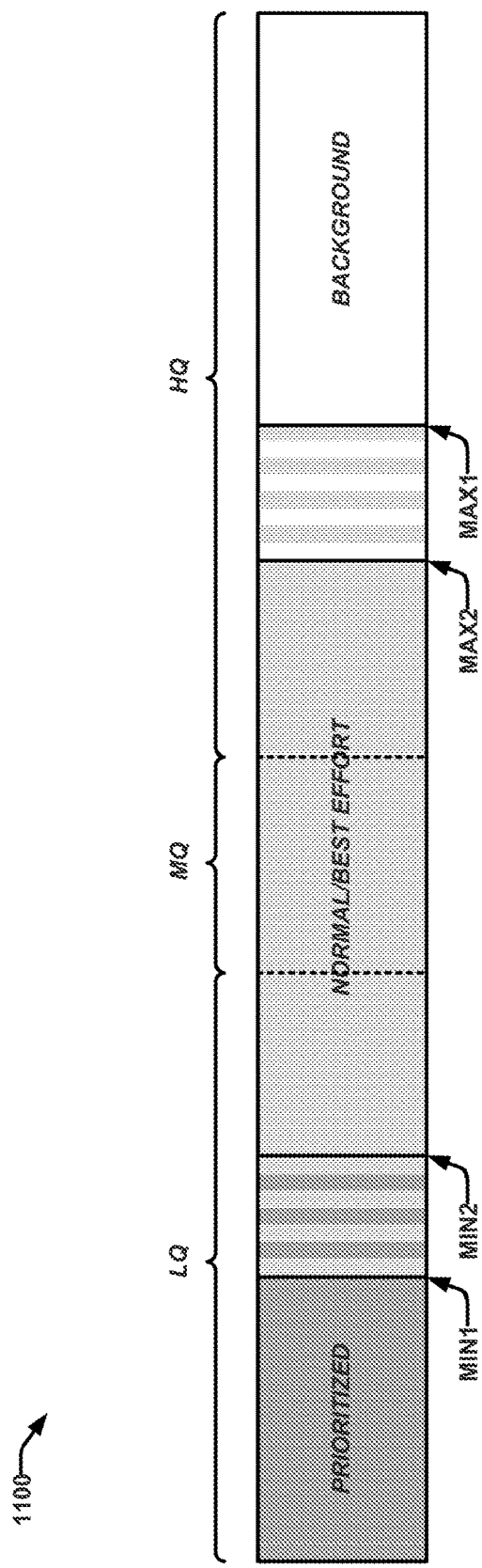
FIG. 10B illustrates an example streaming video buffer and related threshold buffer occupation levels governing a priority level or service delivery option for the streamed traffic.

Another example implementation related to streaming video on-demand is illustrated in FIG. 10A. In this example, the user requests a background or prioritized service delivery option (low priority or high priority, respectively) depending on the current play-out buffer level. In the example implementation of FIG. 10A, the service delivery option decisions at the end node 6 are based on one or more threshold levels, such as those illustrated in FIG. 10B (i.e., min1, min2, max2, max1). FIG. 10B illustrates an example streaming video buffer 1100 with example thresholds that govern transitions between service delivery options (e.g., between background, normal/BE, and prioritized service delivery options (as shown) and low priority, normal/BE priority, and high priority (not shown)) The buffer 1100 may also be logically divided into multiple regions (LQ/MQ/HQ), each corresponding to a particular range of buffer load levels. Specifically, the LQ/MQ/HQ regions of buffer 1100 correspond to buffer load level ranges at which the media client requests Low-Quality/Medium-Quality/High-Quality representation chunks, respectively. Some particular embodiments may also be applied for adaptive (i.e., DASH) videos, wherein the end node 6 may implement a buffer-based algorithm for choosing a specific quality representation.

The prioritized service delivery option provides relative prioritization for low buffer levels. In this way video freeze events due to buffer underrun may be avoided or at least reduced and pre-buffering times also reduced, improving the QoE experience of the users. Once the buffer occupancy reaches a level that is considered safe for avoiding the video freeze the client may switch back to the normal service. If the buffer occupancy further increases reaching comfortable values then the user/application/end node may apply for the background service delivery option in order to accumulate tokens for further potential low-buffer events.

This functionality is shown in the flowchart of FIG. 10A. At block 1002, a streaming video starting event may occur, for instance, for a particular application running on the end node 4. This may include, for example, a user has selected a cloud-hosted streaming video for playback on the end node 4. As the video stream is initiated, video content may be delivered by the network using normal (or best effort) service at block 1004. While the stream is ongoing, the end node 4 may continuously or periodically monitor the occupancy level of its streaming video buffer and may compare the buffer occupancy level to one or more thresholds. For instance, at block 1006 and block 1014, a most recently determined buffer occupancy level may be compared to the max1 threshold and the min1 threshold, respectively. If the buffer occupancy level is not above the max1 threshold and is not below the min1 threshold, the end node 4 will not request an altered traffic priority level and the streaming traffic will be delivered according to normal or best effort service (block 1004).

However, if the buffer occupancy level is above the max1 threshold, the end node 4 may determine whether the network has offered a low priority level such as the background service delivery option to the end node 4. If so, the end node 4 may request use of the background service delivery option at block 1008 and, if approved, the streaming traffic will be delivered according to the background service delivery option at block 1010. Again, during the period for which the background service delivery option is implemented at block 1010, the end node 4 may monitor the streaming video buffer 1100 continuously or periodically to determine whether its occupancy level is below the max2 threshold at block 1012. If so, the end node 4 may implement a policy decision to alter the priority level of the streaming video traffic to normal/BE level (return to block 1004). If, however, the buffer occupancy level is not below the max2 threshold, the background service delivery option will be maintained for the streamed video traffic (return to block 1010).

Returning to block 1014, if it is determined that the buffer occupancy level is below the min1 threshold, the end node 4 may further determine at block 1016 whether it has usable tokens that were awarded previously for its use of the background service delivery option (i.e., low priority level) for traffic and whether a request to utilize the prioritized service delivery option has been acknowledge by the network (e.g., network node 8). If either of these conditions is not met, the priority level or service delivery option of the streamed traffic may be altered to normal/BE (return to block 1004)). If, however both of the above conditions of block 1016 are true, the service delivery option for the streaming video traffic may be altered to the prioritized service delivery option (or high priority level).

Again, during the period for which the prioritized service delivery option is implemented at block 1018, the end node 4 may monitor the streaming video buffer 1100 continuously or periodically to determine whether its occupancy level is above the min2 threshold at block 1018. If so, the end node 4 may implement a policy decision to alter the priority level of the streaming video traffic to normal/BE level (return to block 1004). If, however, the buffer occupancy level is not above the max2 threshold, the traffic will maintain the prioritized service delivery option for the streamed video traffic (return to block 1018).

The present embodiments may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for controlling a communication network to deliver traffic to and/or from an end node, the method comprising the end node:
    transmitting, to a network node in the network, information indicating a user-controllable selection at the end node to have at least some of the end node's traffic delivered by the network with a low priority level that is lower than a high priority level, in exchange for the network node awarding the end node with one or more tokens for use of the low priority level;
    responsive to selection of the low priority level, transmitting and/or receiving at least some of the end node's traffic over the communication network in accordance with the low priority level;
    transmitting, to the network node, information indicating a user-controllable selection at the end node to have at least some of the end node's traffic delivered by the network with the high priority level, with one or more tokens awarded to the end node redeemed for use of the high priority level;
    responsive to selection of the high priority level, transmitting and/or receiving at least some of the end node's traffic over the communication network in accordance with the high priority level;
    wherein the high priority level is higher than a best-effort level in which the communication network delivers the end node's traffic with best-effort service; and
    wherein the low priority level is lower than the best-effort level, wherein no tokens are awarded or required for use of the best-effort level.

2. The method of claim 1:
    further comprising the end node receiving a notification from the network node indicating that the low priority level is available for selection at the end node; and
    wherein the information indicating selection of the low priority level is transmitted responsive to receiving the notification.

3. The method of claim 1, further comprising the end node receiving the selection of a low or high priority level from a user of the end node via a user interface presented to the user.

4. The method of claim 3, wherein the selection is made directly by the user via the user interface.

5. The method of claim 3, wherein the selection is made indirectly by the user via the user interface, through rules or settings that the user specifies for automatically invoking use of different priority levels by different applications and/or under different conditions.

6. The method of claim 1, further comprising the end node:
    measuring values for one or more metrics associated with the end node's use of the low priority level;
    calculating a number of tokens awarded to the end node for use of the low priority level as a function of the values; and
    verifying that the network node awarded a correct number of tokens due to the end node, by inspecting a report received from the network node indicating the values.

7. The method of claim 1, wherein the end node is awarded with a defined number of tokens for each unit of time for which the end node uses the low priority level, and/or a defined number of tokens is redeemed for each unit of time for which the end node uses the high priority level.

8. The method of claim 1, wherein the end node is awarded with a defined number of tokens for each unit of data delivered to and/or from the end node using the low priority level, and/or a defined number of tokens is redeemed for each unit of data delivered to and/or from the end node using the high priority level.

9. The method of claim 1, wherein the end node is awarded with a defined number of tokens for each unit of congestion that the end node's use of the low priority level spares in at least a part of the network, and/or a defined number of tokens is redeemed for each unit of congestion that the end node's use of the high priority level consumes in at least a part of the network.

10. The method of claim 1, wherein the end node uses different priority levels for different traffic associated with different applications or flows.

11. The method of claim 1, wherein the information is transmitted by a controlling application on the end node that controls the respective priority levels with which traffic for multiple controlled applications are to be delivered, the information indicating a user-controllable selection to have traffic for a particular one of the controlled applications delivered by the network with a low priority level or high priority level.

12. An end node for controlling a communication network to deliver traffic to and/or from the end node, the end node comprising:
    processing circuitry;
    memory containing instructions executable by the processing circuitry whereby the end node is operative to:
        transmit, to a network node in the network, information indicating a user-controllable selection at the end node to have at least some of the end node's traffic delivered by the network with a low priority level, in exchange for the network node awarding the end node with one or more tokens for use of the low priority level;
        responsive to selection of the low priority level, receive at least some of the end node's traffic over the communication network in accordance with the low priority level;
        transmit, to the network node, information indicating a user-controllable selection at the end node to have at least some of the end node's traffic delivered by the network with a high priority level, with one or more tokens awarded to the end node redeemed as payment for use of the high priority level; and responsive to selection of the high priority level, receive at least some of the end node's traffic over the communication network in accordance with the high priority level;

wherein the high priority level is higher than a best-effort level in which the communication network delivers the end node's traffic with best-effort service; and wherein the low priority level is lower than the best-effort level, wherein no tokens are awarded or required for use of the best-effort level.

13. A network node in a communication network for controlling the network to deliver traffic to and/or from a first end node, the network node comprising:

processing circuitry;

memory containing instructions executable by the processing circuitry whereby the network node is operative to:

receive information indicating a user-controllable selection at the first end node to have at least some of the first end node's traffic delivered by the network with a low priority level; and control, responsive to selection of the low priority level, the communication network to:
deliver at least some of the first end node's traffic with the low priority level; and
award the first end node with one or more tokens for use of the low priority level;

receive information indicating a user-controllable selection at the first end node to have at least some of the first end node's traffic delivered by the network with a high priority level; and responsive to selection of the high priority level:
redeem one or more tokens awarded to the first end node;
control the communication network to deliver at least some of the first end node's traffic with the high priority level;

wherein the high priority level is higher than a best-effort level in which the communication network delivers the first end node's traffic with best-effort service; and wherein the low priority level is lower than the best-effort level, wherein no tokens are awarded or required for use of the best-effort level.

14. A non-transitory computer readable recording medium storing a computer program product for controlling a communication network to deliver traffic to and/or from an end node, the computer program product comprising software instructions which, when run on processing circuitry of the end node, causes the end node to:

transmit, to a network node in the network, information indicating a user-controllable selection at the end node to have at least some of the end node's traffic delivered by the network with a low priority level that is lower than a high priority level, in exchange for the network node awarding the end node with one or more tokens for use of the low priority level;

responsive to selection of the low priority level, transmit and/or receive at least some of the end node's traffic over the communication network in accordance with the low priority level;

transmit, to the network node, information indicating a user-controllable selection at the end node to have at least some of the end node's traffic delivered by the network with the high priority level, with one or more tokens awarded to the end node redeemed for use of the high priority level; and responsive to selection of the high priority level, transmit and/or receive at least some of the end node's traffic over the communication network in accordance with the high priority level;

wherein the high priority level is higher than a best-effort level in which the communication network delivers the end node's traffic with best-effort service; and wherein the low priority level is lower than the best-effort level, wherein no tokens are awarded or required for use of the best-effort level.

15. The network node of claim 13, wherein the instructions are such that the network node is operative to determine how to allocate shared transmission resources amongst different end nodes by allocating more of the shared transmission resources to the first end node's traffic when the first end node is using the high priority level than when the first end node is using the low priority level.

* * * * *